US009886818B2

(12) United States Patent
Leblanc et al.

(10) Patent No.: US 9,886,818 B2
(45) Date of Patent: Feb. 6, 2018

(54) ENHANCED GAMING MACHINE WITH INTERACTIVE THREE DIMENSIONAL GAME ENVIRONMENT

(71) Applicant: IGT CANADA SOLUTIONS ULC, Moncton (CA)

(72) Inventors: Vicky Leblanc, Moncton (CA); Reuben Dupuis, Moncton (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 463 days.

(21) Appl. No.: 14/570,606

(22) Filed: Dec. 15, 2014

(65) Prior Publication Data

US 2016/0171816 A1 Jun. 16, 2016

(51) Int. Cl.
*G06F 17/00* (2006.01)
*G07F 17/32* (2006.01)

(52) U.S. Cl.
CPC ........ *G07F 17/3223* (2013.01); *G07F 17/326* (2013.01); *G07F 17/3265* (2013.01)

(58) Field of Classification Search
None
See application file for complete search history.

(56) References Cited

U.S. PATENT DOCUMENTS

2005/0059488 A1* 3/2005 Larsen .................... A63F 13/10 463/36
2009/0227315 A1* 9/2009 LaRue .................. A63F 13/005 463/16
2013/0331184 A1* 12/2013 Kelly .................. G07F 17/3211 463/31
2014/0066178 A1* 3/2014 Kelly ..................... H04N 13/04 463/25
2014/0073386 A1* 3/2014 Aoki ................... G07F 17/3206 463/13

* cited by examiner

*Primary Examiner* — Paul A D'Agostino
(74) *Attorney, Agent, or Firm* — Sage Patent Group

(57) ABSTRACT

An electronic gaming machine that includes a three-dimensional (3D) graphics processor to generate a 3D game environment for a game. A display controller defines a view window of the three-dimensional game environment. The view window defines a portion of the three-dimensional game environment. An electronic display device displays, via a display interface, the portion of the three-dimensional game environment defined by the view window using the 3D graphics processor. A player input device detects a player request interaction input to update the view window to navigate within the three dimensional game environment. In response to detection by the player input device, the display controller updates the view window based on the update action to define another portion of the three-dimensional game environment. The player can navigate throughout the 3D game environment using player request interaction input.

18 Claims, 20 Drawing Sheets

ENHANCED GAMING MACHINE WITH INTERACTIVE THREE DIMENSIONAL GAME ENVIRONMENT

FIELD

Embodiments described herein relate to the field of electronic gaming machines. The embodiments described herein particularly relate to the field of providing a gaming machine with three dimensional enhancements.

INTRODUCTION

Various video gaming terminals or machines may include online gaming systems (that enable users to play games using computer devices, whether desktop computers, laptops, tablet computers or smart phones), computer programs for use on a computer device (including desktop computer, laptops, tablet computers of smart phones), or gaming consoles that are connectable to a display such as a television or computer screen.

Video gaming machines may be configured to enable users to play a variety of different types of games. Players may wager on gaming outcomes to win tangible awards. One or more winning combinations may be displayed using a pattern of gaming elements in an arrangement of cells (or an array) of the matrix, where each cell may include a gaming element, and where gaming elements may define winning combinations (or a winning pattern). Games that are based on winning patterns may be referred to as pattern games. The game rules may define one or more winning patterns of gaming elements, and these winning patterns may be associated with credits, points or the equivalent.

Example games may involve a matrix or grid of cells, where gaming symbols or elements may be displayed within the cells. A pick-a-prize game may enable a player to select a gaming symbol or element. The selected gaming symbol or element may be used to determine a tangible award for the player based on a winning outcome. A pick-a-prize game may be a primary game, a bonus game or secondary game.

Gaming systems or machines are popular. However, there is a need to compete for the attention of users, and therefore it is necessary to innovate by launching new and engaging game machines.

SUMMARY

In accordance with one aspect, an electronic gaming machine has at least one data storage device to store game data for a game. A game controller detects game activation and controls the game in accordance with a set of game rules using the game data. A 3D graphics processor generates an interactive 3D game environment. The interactive 3D environment provides a prize selection game zone with prize selector game symbols visible at prize locations. The electronic gaming machine has an electronic 3D enabled touch sensitive gaming display device. A display controller controls the electronic 3D enabled touch sensitive gaming display device using the 3D graphics processor to display a view window defining a portion of the interactive 3D game environment. A player input device continuously detects, at the electronic 3D enabled touch sensitive gaming display device, player request interaction input to update the view window. Each player request interaction input includes an update action to navigate to a different portion of the interactive 3D game environment to locate prize selector game symbols at different prize locations.

In response to detection by the player input device of a player request interaction input, the display controller controls the electronic gaming display device using the three-dimensional graphics processor to update the view window to navigate to the different portion of the interactive 3D game environment to render visible the prize selector game symbol at the prize location. The update includes a graphical navigation animation effect displayed on the electronic gaming display representative of navigating to the new portion of the interactive 3D game environment based on the update action.

The player input device detects, at the electronic 3D enabled touch sensitive gaming display device, player selection interaction input of the prize selector at the prize location to trigger a winning outcome of the game.

The update action of the player request interaction input may define a rotation of the portion of the three-dimensional game environment defined by the view window. The updated view window may define a rotated portion of the 3D game environment.

The update action of the player request interaction input may define a request to move the view window to the new portion of the 3D game environment. The request to move may be in at least one direction of up, down, left, right, and diagonal.

The update action of the player request interaction input may define a request to increase the view window to a different portion of the 3D game environment that is larger than the previous portion of the 3D game environment.

The update action of the player request interaction input may define a request to decrease the view window to a portion of the 3D game environment that is smaller than the previous portion of the 3D game environment.

The player input device includes a touch-screen display configured to detect a plurality of player touch interaction inputs, including at least one of swipe up, swipe down, swipe left, swipe right, swipe diagonal, and swipe rotate.

The player input device may include a tracking device to detect player interaction inputs, including at least one of movement up, movement down, movement left, movement right, movement diagonal, and movement rotate.

The player input device includes a gesture recognition device for detecting player gestures as player request interaction inputs and processing the detected player gestures to generate the update action. The gesture recognition devices may include at least one of a sensor and camera.

The display controller controls the display device to display a plurality of view update indicia which indicate that the view window for three-dimensional game environment may be updated by at least one of a rotation movement, an upward movement, a downward movement, a left movement, and a right movement.

The game controller may configured to: receive, via an input device, one or more wagers for one or more gaming outcomes, determine one or more gaming outcomes, wherein each gaming outcome comprises a selection of game symbols, determine that the one or gaming outcomes results in one or more winning game outcomes, and generate signals for distributing an award based on the one or more winning game outcomes.

In another aspect, there is provided an electronic gaming machine with at least one data storage device to store game data for a game. A game controller detects game activation and controls the game in accordance with a set of game rules using the game data. A 3D graphics processor generates an interactive 3D game environment, where the interactive 3D environment provides a prize selection game zone comprising a plurality of prize selector game symbols visible at a plurality of prize locations. The interactive 3D environment defines a game matrix of cells, where each prize location corresponds to a cell of the game matrix.

The electronic gaming machine includes an electronic 3D enabled gaming display device. A display controller controls the electronic 3D enabled touch sensitive gaming display device using the 3D graphics processor to display a view window defining a first portion of the interactive 3D game environment. The first portion is defined by a first set of cells of the game matrix.

A player input device continuously detects player request interaction input to update the view window, where each player request interaction input comprises an update action to navigate to a second portion of the interactive 3D game environment with at least one prize selector game symbol. The second portion is defined by a second set of cells of the game matrix.

In response to detection by the player input device of a player request interaction input, the display controller controls the electronic gaming display device using the three-dimensional graphics processor to update the view window to navigate to the second portion of the interactive 3D game environment to render visible the prize selector game symbol at the prize location. The update includes a graphical navigation animation effect displayed on the electronic gaming display representative of navigating to the second portion of the interactive 3D game environment based on the update action. The player input device detects, at the electronic 3D enabled gaming display device, player selection interaction input of the prize selector at the prize location to trigger a winning outcome of the game.

The update action of the player request interaction input defines a rotation of the portion of the three-dimensional game environment defined by the view window, and wherein the updated view window defines a rotated portion of the three-dimensional game environment.

The update action of the player request interaction input may define a rotation of the portion of the three-dimensional game environment defined by the view window. The updated view window may define a rotated portion of the 3D game environment.

The update action of the player request interaction input may define a request to move the view window to the new portion of the 3D game environment. The request to move may be in at least one direction of up, down, left, right, and diagonal.

The update action of the player request interaction input may define a request to increase the view window to a different portion of the 3D game environment that is larger than the previous portion of the 3D game environment.

The update action of the player request interaction input may define a request to decrease the view window to a portion of the 3D game environment that is smaller than the previous portion of the 3D game environment.

The player input device includes a touch-screen display configured to detect a plurality of player touch interaction inputs, including at least one of swipe up, swipe down, swipe left, swipe right, swipe diagonal, and swipe rotate.

The player input device may include a tracking device to detect player interaction inputs, including at least one of movement up, movement down, movement left, movement right, movement diagonal, and movement rotate.

The player input device includes a gesture recognition device for detecting player gestures as player request interaction inputs and processing the detected player gestures to generate the update action. The gesture recognition devices may include at least one of a sensor and camera.

The display controller controls the display device to display a plurality of view update indicia which indicate that the view window for three-dimensional game environment may be updated by at least one of a rotation movement, an upward movement, a downward movement, a left movement, and a right movement.

The game controller may configured to: receive, via an input device, one or more wagers for one or more gaming outcomes, determine one or more gaming outcomes, wherein each gaming outcome comprises a selection of game symbols, determine that the one or gaming outcomes results in one or more winning game outcomes, and generate signals for distributing an award based on the one or more winning game outcomes.

In a further aspect, there is provided a method for an electronic gaming machine. An electronic gaming machine store game data for a game at least one data storage device. A game controller detects game activation and controls the game in accordance with a set of game rules using the game data. A 3D graphics processor generates an interactive 3D game environment. The interactive 3D environment provides a prize selection game zone with prize selector game symbols visible at prize locations. The electronic gaming machine has an electronic 3D enabled touch sensitive gaming display device. A display controller controls the electronic 3D enabled touch sensitive gaming display device using the 3D graphics processor to display a view window defining a portion of the interactive 3D game environment. A player input device continuously detects, at the electronic 3D enabled touch sensitive gaming display device, player request interaction input to update the view window. Each player request interaction input includes an update action to navigate to a different portion of the interactive 3D game environment to locate prize selector game symbols at different prize locations.

In response to detection by the player input device of a player request interaction input, the display controller controls the electronic gaming display device using the three-dimensional graphics processor to update the view window to navigate to the different portion of the interactive 3D game environment to render visible the prize selector game symbol at the prize location. The update includes a graphical navigation animation effect displayed on the electronic gaming display representative of navigating to the new portion of the interactive 3D game environment based on the update action. The player input device detects, at the electronic 3D enabled touch sensitive gaming display device, player selection interaction input of the prize selector at the prize location to trigger a winning outcome of the game.

Many further features and combinations thereof concerning embodiments described herein will appear to those skilled in the art following a reading of the instant disclosure.

DETAILED DESCRIPTION

Embodiments described herein relate to an enhanced electronic gaming machine (EGM) that includes a three-dimensional (3D) graphics processor configured to provide games with 3D enhancements. In particular, EGM is configured to generate an interactive 3D game environment for a game in accordance with a set of game rules using game data stored in a data store. Example data stores are described herein. The interactive 3D environment provides a prize selection game zone with prize selector game symbols visible at different prize locations within the interactive 3D environment. A view window defines a portion of the interactive 3D game environment that is currently displayed on the EGM. Player request interaction input received at EGM updates the view window. Player request interaction input involves an update action to navigate to a different portion of the 3D game environment. The view window reveals a new portion of the 3D environment that includes a prize selector game symbol at a prize location. The view window updates with a navigation animation based on the update action. The view window navigates to the new portion of the 3D game environment to render visible the prize selector game symbol at the prize location. A player selection interaction input of the prize selector at the prize location triggers a winning outcome of the game. When a player moves the view window, new prize selector game symbols become visible.

The gaming enhancements described herein may be carried out using a physical EGM. EGM may be embodied in a variety of forms and devices including, for example, portable devices, such as tablets and smart phones, that can access a gaming site or a portal (which may access a plurality of gaming sites) via the internet or other communication path (e.g., a LAN or WAN). The EGM may be located in various venues, such as a casino or an arcade. One example type of EGM is described with respect to FIG. 1.

Figure 1:
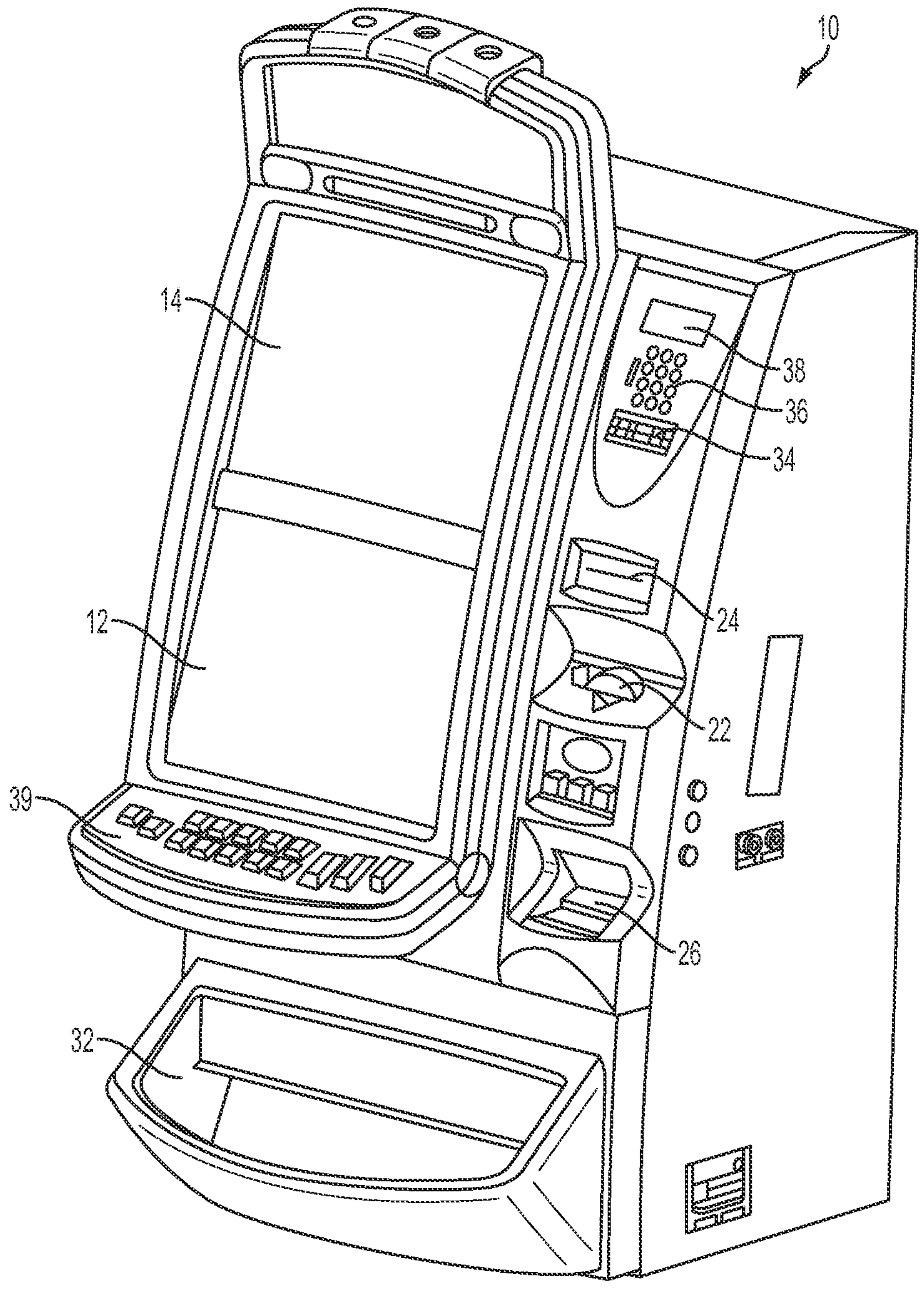
FIG. 1 is a perspective view of an electronic gaming machine for implementing the gaming enhancements according to some embodiments.

FIG. 1 is a perspective view of an EGM 10 configured to provide 3D enhancements. An example embodiment of EGM 10 includes a display 12 that may be a thin film transistor (TFT) display, a liquid crystal display (LCD), a cathode ray tube (CRT), auto stereoscopic 3D display and LED display, an OLED display, or any other type of display. An optional second display 14 provides game data or other information in addition to display 12. Display 14 may provide static information, such as an advertisement for the game, the rules of the game, pay tables, pay lines, or other information, or may even display the main game or a bonus game along with display 12. Alternatively, the area for display 14 may be a display glass for conveying information about the game. Display 12, 14 may also include a camera, sensor, and other hardware input devices.

Display 12, 14 includes an electronic 3D enabled touch sensitive gaming display device that receives touch input from players as player request interaction input to define update actions. For example, the touch input may be a swipe in a direction to define an update action to navigate the interactive 3D environment in the swipe direction. Display 12, 14 may have a touch screen lamination that includes a transparent grid of conductors. Touching the screen may change the capacitance between the conductors, and thereby the X-Y location of the touch may be determined. A processor of EGM 10 associates this X-Y location with a function to be performed. Such touch screens may be used for slot machines, for example, or other types of gaming machines. There may be an upper and lower multi-touch screen in accordance with some embodiments. One or both of display 12, 14 may be configured to have auto stereoscopic 3D functionality.

A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may read from various types of cards, such as smart cards, magnetic strip cards, or other types of cards conveying machine readable information. The card reader reads the inserted card for player and credit information for cashless gaming. Card reader slot 34 may read a magnetic code on a conventional player tracking card, where the code uniquely identifies the player to a host system at the venue. The code is cross-referenced by the host system to any data related to the player, and such data may affect the games offered to the player by the gaming terminal. Card reader slot 34 may also include an optical reader and printer for reading and printing coded barcodes and other information on a paper ticket. A card may also include credentials that enable the host system to access one or more accounts associated with a user. The account may be debited based on wagers by a user and credited based on a win.

An electronic device may couple (by way of a wired or wireless connection) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

Keypad 36 may be an input device such as a touchscreen, or dynamic digital button panel, in accordance with some embodiments.

Player control buttons 39 may include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

EGM 10 may also include a digital button panel. The digital button panel may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on.

EGM 10 may also include hardware configured to provide motion or gesture tracking. For example, the EGM 10 may include a camera. The camera may be used for gesture or motion tracking of player, such as detecting player positions and movements, and generating signals defining x, y and z coordinates. For example, the camera may be used to implement tracking recognition techniques to collect tracking recognition data. An example type of motion tracking is optical motion tracking. The motion tracking may include a body and head controller. The motion tracking may also include an eye controller. EGM 10 may implement eye-tracking recognition technology using camera, sensors (e.g. optical sensor), data receivers and other electronic hardware to capture various forms of player input. A gesture or motion by a player may trigger provision of the 3D game environment in some embodiments or may impact the type of navigation animation or update action to update view window of the 3D environment. Accordingly, EGM 10 may be configured to capture player gesture input and calculate an animation for navigating 3D game environment.

Embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

Accordingly, EGM 10 is particularly configured to provide a 3D game environment. The display screens 12, 14 may display, via a user interface, the 3D game environment and selectable game components or symbols in accordance with a set of game rules using game data, stored in a data store.

A data capture device may capture player data, such as button input, gesture input and so on. The data capture device may include a camera, a sensor or other data capture electronic hardware.

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As described herein, EGM 10 may be configured to provide an interactive 3D game environment. The interactive 3D game environment may be an enhancement to a primary game or may be a new game (e.g. secondary game, portal game, or bonus game) that is independent of the primary game. For example, the interactive 3D game environment may include selector symbols that provide a portal or door to a new interactive 3D game environment with a new set of prize selector symbols in different locations. The portal may create layers of different interactive 3D game environments for navigation. The interactive 3D game environment may be provided dynamically and revealed by dynamic triggers from game content of the primary game in response to electronic data signals collected and processed by EGM 10.

The EGM 10 may include a display 12, 14 with auto stereoscopic three-dimensional functionality. The EGM 10 may include a touch screen display for receiving touch input data to define update actions. The EGM 10 may also include a camera, for example, to further receive player input to define update actions. The EGM 10 may also include several effects and frame lights. The 3D enhancements may be an interactive 3D game environment for additional game components or symbols.

EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

EGM 10 may also include a plurality of effects lights and frame lights. The lights may be synchronized with enhancements of the game. The EGM 10 may be configured to control color and brightness of lights. Additional custom animations (color cycle, blinking, etc.) may also be configured by EGM 10. The custom animations may be triggered by certain gaming events.

FIG. **2*a* is a block diagram of hardware components of EGM 10 according to some embodiments. EGM 10 is shown linked to the casino's host system 41** via network infrastructure. These hardware components particularly configured to provide games with 3D enhancements.

A communications board 42 may contain circuitry for coupling the EGM 10 to network. Communication board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. EGM 10 may communicate over a network using a suitable protocol, such as the G2S protocols.

Communications board 42 communicates, transmits and receives data using a wireless transmitter, or it may be wired to a network, such as a local area network running throughout the casino floor, for example. Communications board 42 may set up a communication link with a master controller and may buffer data between the network and game controller board 44. Communications board 42 may also communicate with a network server, such as in accordance with the G2S standard, for exchanging information to carry out embodiments described herein.

Game controller board 44 includes memory and a processor for carrying out program instructions stored in the memory and for providing the information requested by the network. Game controller board 44 executes game routines using game data stores in a data store accessible to the game controller board 44, and cooperates with 3D graphics processor 54 and display controller 52 to provide games with 3D enhanced game components.

Peripheral devices/boards communicate with the game controller board 44 via a bus 46 using, for example, an RS-232 interface. Such peripherals may include a bill validator 47, a coin detector 48, a smart card reader or other type of credit card reader 49, and player control inputs 50 (such as buttons or a touch screen).

Player input device 50 may include the keypad, the buttons, touchscreen display, gesture tracking hardware, data capture device as described herein. Other peripherals may be one or more cameras used for collecting player input data, or other player movement or gesture data that may be used to trigger the display of the 3D game environment and navigation of the 3D game environment by updating the view window. Player input device 50 may be used to generate player request interaction inputs to navigate to different portions of the 3D game environment to update the viewing window. Player input device 50 may be integrated with touch screen display 12, 14 to detect player interaction input at the touch screen display 12, 14.

Game controller board 44 may also control one or more devices that produce the game output including audio and video output associated with a particular game that is presented to the user. For example, audio board 51 may convert coded signals into analog signals for driving speakers.

Game controller board 44 may be coupled to an electronic data store storing game data for one or more games. The game data may, for example, include a set of game rules for each of the one or more games. The electronic data store may reside in a data storage device, e.g., a hard disk drive, a solid state drive, or the like. Such a data storage device may be included in EGM 10, or may reside at host system 41. In some embodiments, the electronic data store storing game data may reside in the cloud.

Card reader 49 reads cards for player and credit information for cashless gaming. Card reader 49 may read a magnetic code on a conventional player tracking card, where the code uniquely identifies the player to a host system at the venue. The code is cross-referenced by host system 41 to any data related to the player, and such data may affect the games offered to the player by the gaming terminal. Card reader 49 may also include an optical reader and printer for reading and printing coded barcodes and other information on a paper ticket. A card may also include credentials that enable host system 41 to access one or more accounts associated with a user. The account may be debited based on wagers by a user and credited based on a win.

3D graphics processor 54 may be configured to generate and render 3D game enhancements based on one or more game rules as directed by game controller board 44. The game enhancements involve a view window navigating the interactive 3D game environment to render visible different prize selector symbols. The 3D graphics processor 54 may be a specialized electronic circuit designed for 3D image processing in order to manipulate and transform data stored in memory to accelerate the creation of 3D images in a frame buffer for output to the display by way of display controller 52. The 3D graphics processor 54 may redraw various 3D game enhancements as they dynamically update. 3D graphics processor 54 may cooperate with game controller board and display controller 52 to generate and render 3D enhancements as described herein. 3D graphics processor 54 generates an interactive 3D game environment that provides a prize selection game zone with prize selector game symbols visible at different prize locations within the interactive 3D game environment. 3D graphics processor 54 generate navigation effects to represent navigation to different portions of the interactive 3D game environment in response to player interaction input.

Display controller 52 may require a high data transfer rate and may convert coded signals to pixel signals for the display. Display controller 52 and audio board 51 may be directly connected to parallel ports on the game controller board 44. The electronics on the various boards may be combined onto a single board. Display controller 52 controls output to one or more displays 12, 14 (e.g. an electronic 3D enabled touch sensitive gaming display device).

Display controller cooperates with 3D graphics processor 54 to render 3D enhancements on display 12, 14.

Display controller 52 may be configured to interact with 3D graphics processor 54 to control the display 12, 14 to display a view window defining a portion of the interactive 3D game environment. Player input device 50 continuously detects, at the display 12, 14, player request interaction input to update the view window. Each player request interaction input defines an update action to navigate to a different portion of the interactive 3D game environment. The navigation reveals different prize selector game symbols at various prize locations that may be hidden from initial views of the interactive 3D environment.

In response to detection by the player input device of player request interaction input, display controller 52 controls the display 12, 14 using the 3D graphics processor 54 to update the view window to navigate to a different portion of the interactive 3D game environment to render visible one or more prize selector game symbols at different prize locations that were hidden in the previous view window. The update controlled by display controller 52 includes a graphical navigation animation effect displayed on the electronic gaming display representative of navigating to the new portion of the interactive 3D game environment based on the update action.

Display controller 52 generates 3D navigation animations moving through the interactive 3D environment to reveal prize selector symbols. Player selection of one or more prize selector symbols may result in a winning gaming outcome and an enhanced game experience for the user.

Host system 41 may store account data for players. EGM 10 may communicate with host system 41 to update such account data, for example, based on wins and losses. In an embodiment, host system 41 stores the aforementioned game data, and EGM 10 may retrieve such game data from host system 41 during operation.

In some embodiments, the electronics on the various boards described herein may be combined onto a single board. Similarly, in some embodiments, the electronics on the various controllers and processors described herein may be integrated. For example, the processor of game controller board 44 and 3D graphics processor 54 may be a single integrated chip.

EGM 10 may be configured to provide 3D enhancements to one or more games playable at EGM 10. The enhancements may be to a primary game, secondary game or bonus game.

Figure 2A:
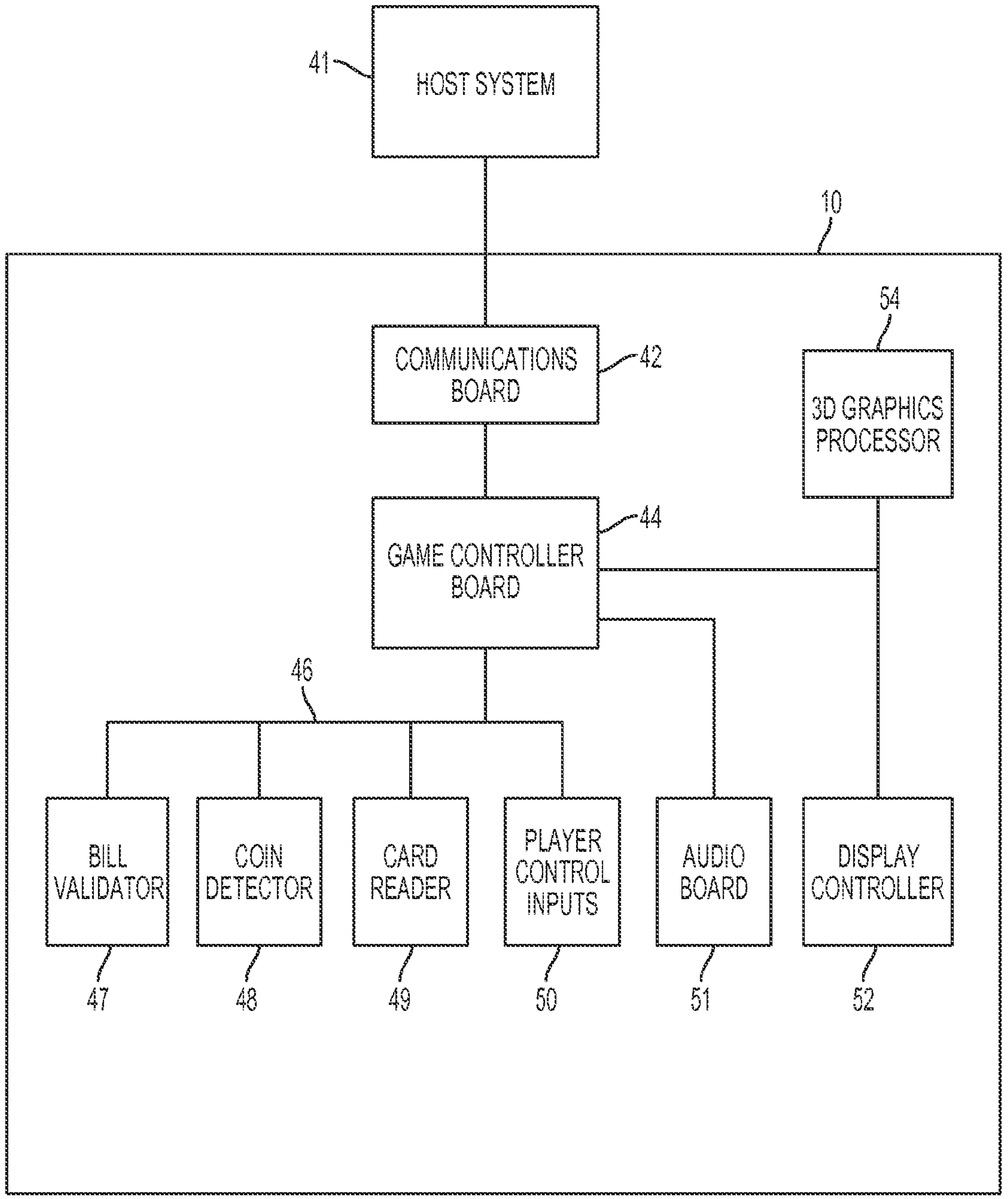
FIG. 2*a* is a schematic diagram of an electronic gaming machine linked to a casino host system according to some embodiments.
Figure 2B:
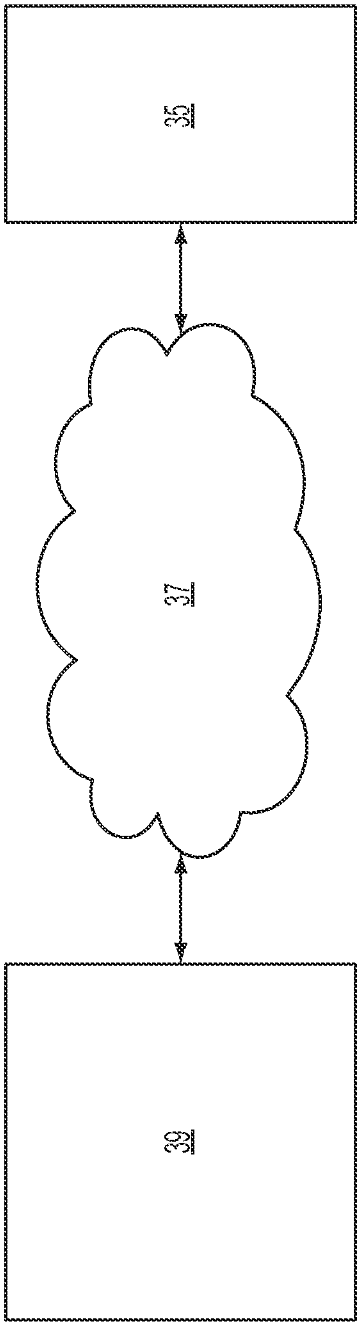
FIG. 2*b* is a schematic diagram of an exemplary online implementation of a computer system and online gaming system according to some embodiments.

FIG. 2*b* illustrates an online implementation of a gaming system that provides 3D enhancements and an interactive 3D environment as described herein. The gaming system may be an online gaming device (which may be an example implementation of an EGM) in accordance with the 3D gaming enhancements. As depicted, the gaming system includes a server computer 35 and a gaming device 39 connected via network 37.

In some embodiments, gaming server 35 and gaming device 39 cooperate to implement the functionality of EGM 10, described above. So, aspects and technical features of EGM 10 may be implemented in part at gaming device 39, and in part at gaming server 35.

Gaming server 35 may be configured to enable online gaming, and may include game data and game logic to implement the games and enhancements disclosed herein. For example, gaming server 35 may include a player input engine configured to process player input and respond according to game rules. Gaming server 35 may include a graphics engine configured to generate the interactive 3D game environment as disclosed herein. In some embodiments, gaming server may provide rendering instructions and graphics data to gaming device 39 so that graphics may be rendered at gaming device 39.

Gaming server 35 may also include a movement recognition engine that may be used to process and interpret collected player movement data, to transform the data into data defining manipulations of update actions for view window changes.

Network 37 may be any network (or multiple networks) capable of carrying data including the Internet, Ethernet, POTS line, PSTN, ISDN, DSL, coaxial cable, fiber optics, satellite, mobile, wireless (e.g. Wi-Fi, WiMAX), SS7 signaling network, fixed line, local area network, wide area network, and others, including any combination of these.

Gaming device 35 may be particularly configured with hardware and software to interact with gaming server 39 via network 37 to implement gaming functionality and render 3D enhancements, as described herein. For simplicity only one gaming device 35 is shown but an electronic gaming system may include one or more gaming devices 35 operable by different players. Gaming device 35 may be implemented using one or more processors and one or more data stores configured with database(s) or file system(s), or using multiple devices or groups of storage devices distributed over a wide geographic area and connected via a network (which may be referred to as "cloud computing"). Aspects and technical features or EGM 10 may be implemented using gaming device 35.

Gaming device 35 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

Gaming device 35 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Gaming device 35 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Gaming device 35 is operable to register and authenticate users (using a login, unique identifier, and password for example) prior to providing access to applications, a local network, network resources, other networks and network security devices. Computing device 30 may serve one user or multiple users.

Gaming device 35 may include one or more input devices (e.g. player input device 50), such as a keyboard, mouse, camera, touch screen and a microphone, and may also include one or more output devices such as a display screen (with 3D capabilities) and a speaker.

Gaming device 35 has a network interface in order to communicate with other components, to access and connect to network resources, to serve an application and other applications, and perform other computing applications.

Gaming device 35 connected to gaming server 39 by way of network 37 to access technical 3D enhancements to games as described herein. Multiple gaming devices 35 may connect to gaming server 39, each gaming device 35 operated by a respective player.

Figure 2C:
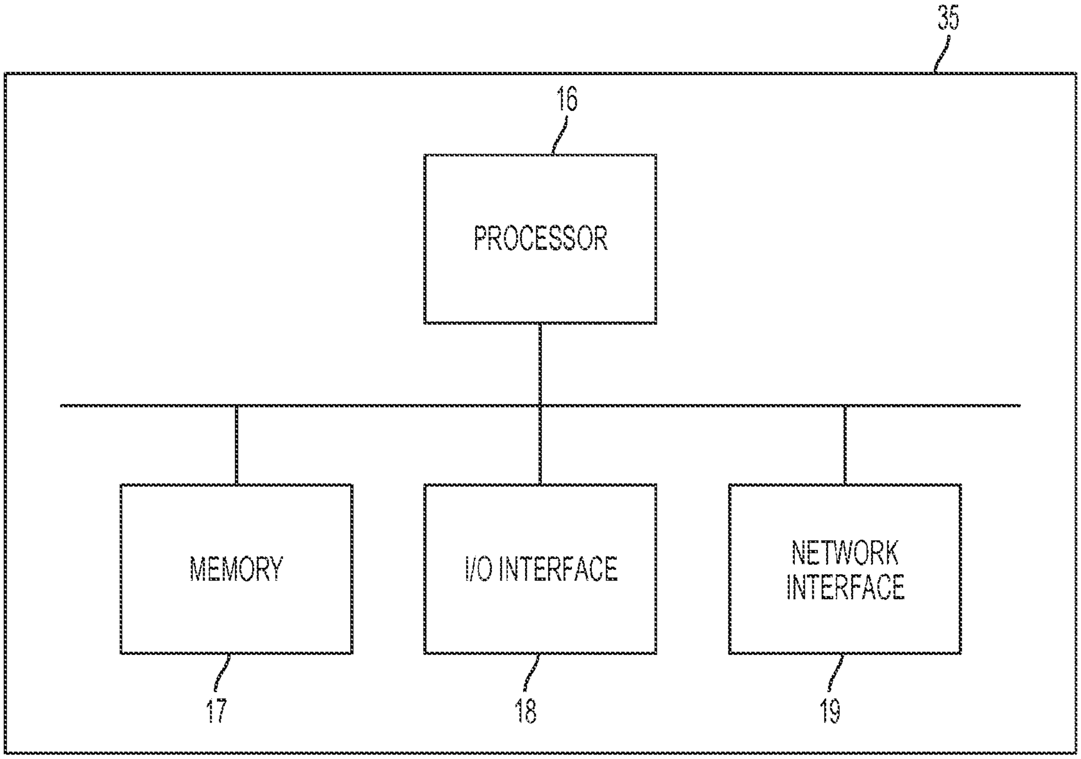
FIG. 2*c* is a schematic diagram of the computer system of FIG. 2*b* according to some embodiments.

FIG. 2C is a block diagram depicting hardware components of a gaming device 35, exemplary of an embodiment.

As depicted, gaming device 35 includes at least one processor 16, memory or data store 17, at least one I/O interface 18, and at least one network interface 19.

Processor 16 may be any type of processor, such as, for example, any type of general-purpose microprocessor or microcontroller, a DSP processor, an integrated circuit, an FPGA, a reconfigurable processor, a PROM, or any combination thereof. Processor 16 may also be a 3D graphics processor adapted to generate and render 3D graphics, as described above.

Memory 17 may be any type of electronic memory that is located either internally or externally such as, for example, RAM, ROM, CDROM, electro-optical memory, magneto-optical memory, EPROM, and EEPROM, FRAM or the like.

I/O interfaces 18 enables gaming device 35 to interconnect with input and output devices, e.g., peripheral devices or external storage devices. Such peripheral devices may include one or more input devices, such as a keyboard, mouse, camera, touch screen and a microphone, and may also include one or more output devices such as a display screen (with three dimensional capabilities) and a speaker.

Network interfaces 19 enables gaming device 35 to communicate with other networks, to access and connect to network resources, to serve an application, to access other applications, and perform other computing applications by connecting to a network such as network 37.

In an embodiment, gaming server 39 may include hardware components substantially similar to those shown in FIG. 2C.

In an embodiment, gaming device 35 and/or gaming server 39 may be implemented using multiple devices, multiple databases, or multiple storage devices distributed over a wide geographic area and connected via a network (which may be referred to as "cloud computing"). In an embodiment, EGM 10 and gaming server 39 may be integrated as a single system or a single device.

Figure 2D:
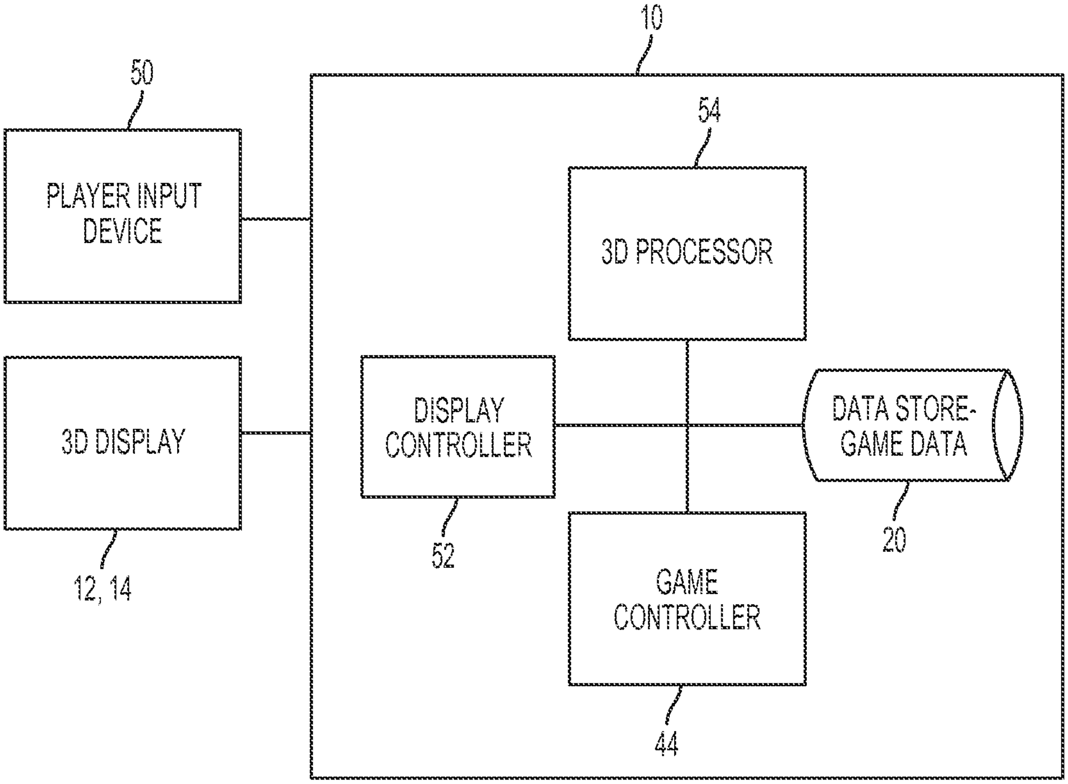
FIG. 2*d* is a schematic diagram of an exemplary electronic gaming machine according to some embodiments.
Figure 3:
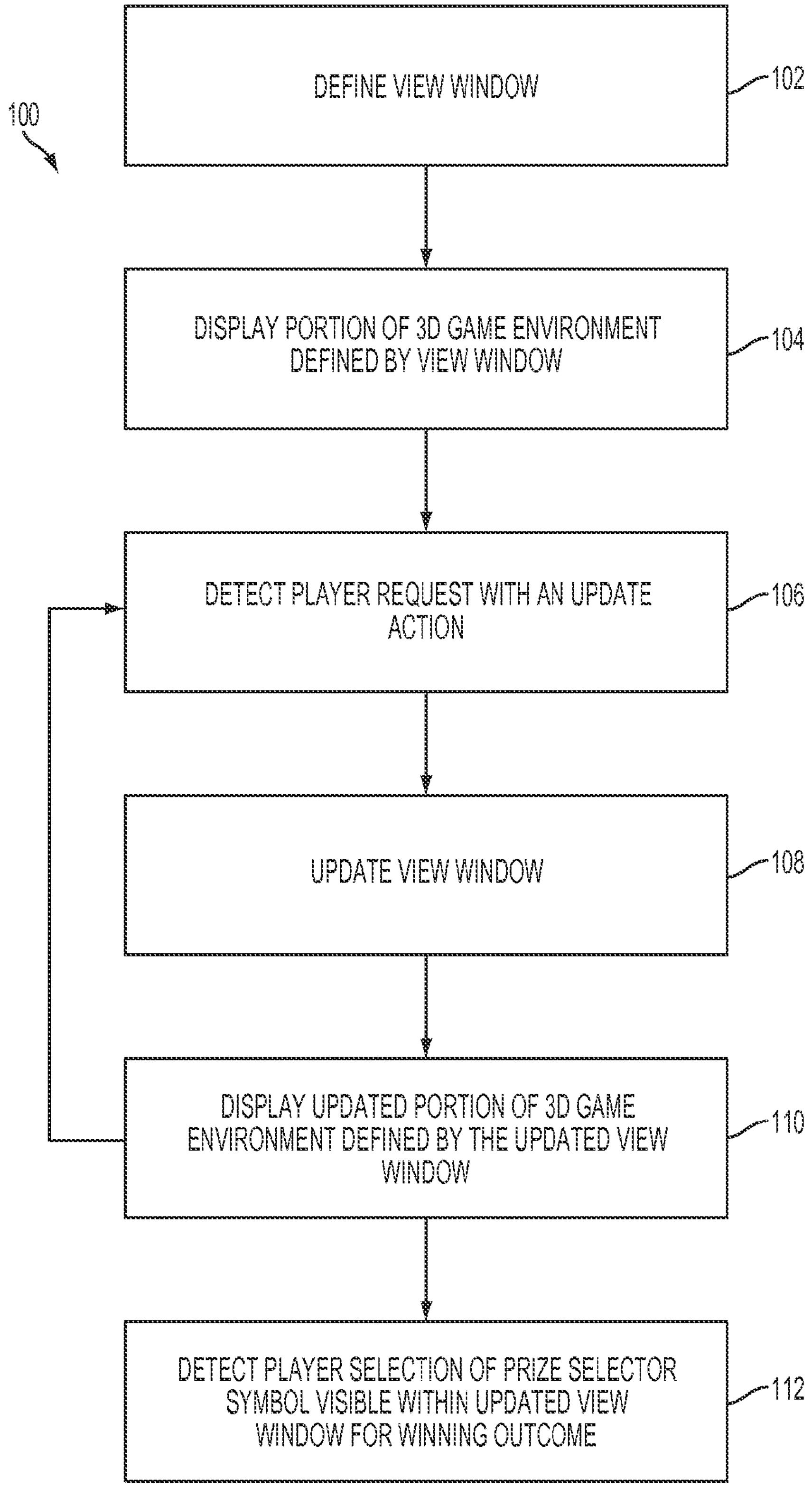
FIG. 3 is a flowchart diagram of a method for a gaming machine according to some embodiments.

FIG. 2D is a schematic of an example EGM 10 according to some embodiments. Various components of EGM 10 shown in this example are described herein in relation to FIGS. 1 and 2B. FIG. 3 is a flowchart of a method 100 implemented by EGM 10 using various components of EGM 10. For simplicity of illustration, method 100 will be described with reference to FIG. 2D and EGM 10 but it may be implement using gaming device 35, game server 39 or a combination thereof.

As shown, EGM 10 may include at least one data store 20 storing game data for a game. EGM 10 may include a game controller 44 for detecting game activation and controlling the game in accordance with a set of game rules using the game data. The game controller 44 is configured to receive wagers for gaming outcomes, and determine gaming outcomes. A gaming outcome involves a selection of prize selector game symbol(s). The game controller 44 is configured to determine a winning game outcome and generate signals for distributing an award based on the winning game outcome.

EGM 10 includes an electronic 3D enabled touch sensitive gaming display device 12, 14. EGM 10 may include a 3D graphics processor 54 to generate an interactive 3D game environment as described. The interactive 3D environment provides a prize selection game zone with prize selector game symbols visible at different prize locations.

At 102 (FIG. 3), display controller 52 defines a view window defining a portion of the interactive 3D game environment. The interactive 3D game environment may be a 360 degree environment which the player can navigate within using player request interaction input by swiping the screen to move the view of the environment side to side, or up and down or rotation, for example. Possible prize selector symbols may be located all around this interactive 3D environment with a possibility of other interactive 3D elements such as portals, animated game symbols and so on. The interactive 3D game environment creates an engaging pick-a-prize type game experience for the player. Player request interactive input allow the player to move within the interactive 3D environment through a view window, creating a larger prize selection game zone which the player can navigate using interactive touch input.

At 104, display controller 52 controls the electronic 3D enabled touch sensitive gaming display device 12, 14 using the 3D graphics processor to display the view window defining a portion of the interactive 3D game environment.

Figure 4:
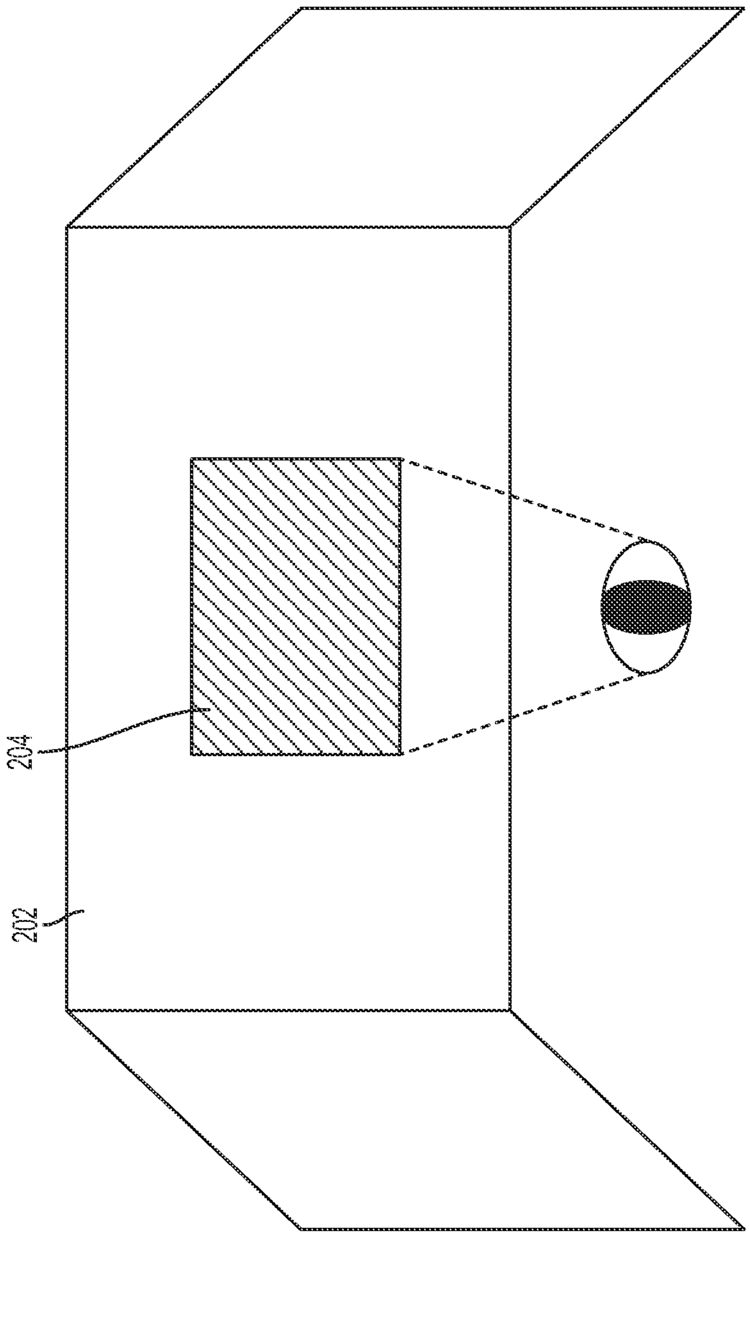
FIGS. 4 to 17 are schematics diagrams of example three-dimensional game environments and view windows according to some embodiments.

FIG. 4 illustrates a schematic diagram of an example interactive 3D game environment 202 with a view window 204 defining a portion of the interactive 3D game environment 202. The initial view window presents the player with a default portion of the prize selection zone of the interactive 3D game environment 202.

Figure 5:
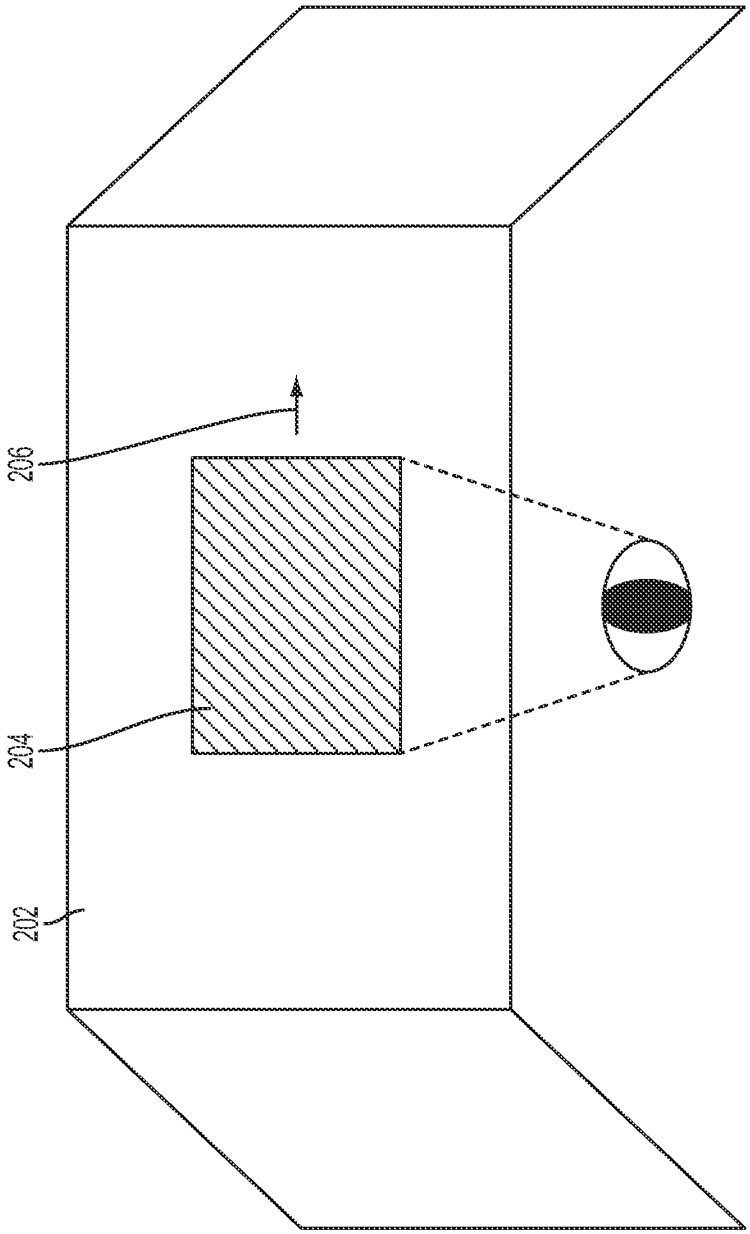

As shown in FIG. 5, the display controller 52 may control the display 12, 14 to provide a visual cue 206 which will indicate to the player that the interactive 3D environment 206 can be navigated by rotation or movement of the view window 204 via player request interactive input such as by swiping the display 12, 14. The visual cue 206 provides guidance for the player. Other examples of visual cues 206 include prompts, animations, arrows, and so on. The view window 204 represents the portion of the interactive 3D game environment 202 that is currently visible on display 12, 14. The visual cue may be referred to as view update indicia to indicate that view windows for 3D game environment 202 may be updated by rotation movement, an upward movement, a downward movement, a left movement, a right movement, and so on as visual navigation guides.

The interactive 3D game environment 202 example depiction illustrates an approximately 180 degree wrap around environment but it may be 360 degree wrap around environment or other variations. The shape of the interactive 3D game environment 202 may vary such as a cube or cylinder or other sided shape. The interactive 3D game environment 202 may also depict a 3D virtual world with forward and backward navigation through the interactive 3D game environment 202. The interactive 3D game environment 202 provides a larger prize selection game zone than the size of the view window 204 to provide more options and space for placement of prize selector game symbols.

At 106, a player input device 50 may continuously detect, at the electronic 3D enabled touch sensitive gaming display device 12, 14, player request interaction input to update the view window. Multiple player request interaction input trigger multiple navigation animations on display device 12, 14 to navigate the view window 204 within the interactive 3D game environment 202.

An example may be a touch input with a swipe in a direction or a particular touch gesture. Player request interaction input defines an update action to navigate to a different portion of the interactive 3D game environment to reveal prize selector game symbols. Other example player request interaction input include gestures or body movements.

At 108, in response to detection of each player request interaction input, display controller 52 continuously controls the electronic gaming display device 12, 14 using the 3D graphics processor 54 to update the view window 204 to navigate to a new portion of the interactive 3D game environment. The new portion may overlap some of the previous portion or may not overlap any of the previous portions.

Figure 6:
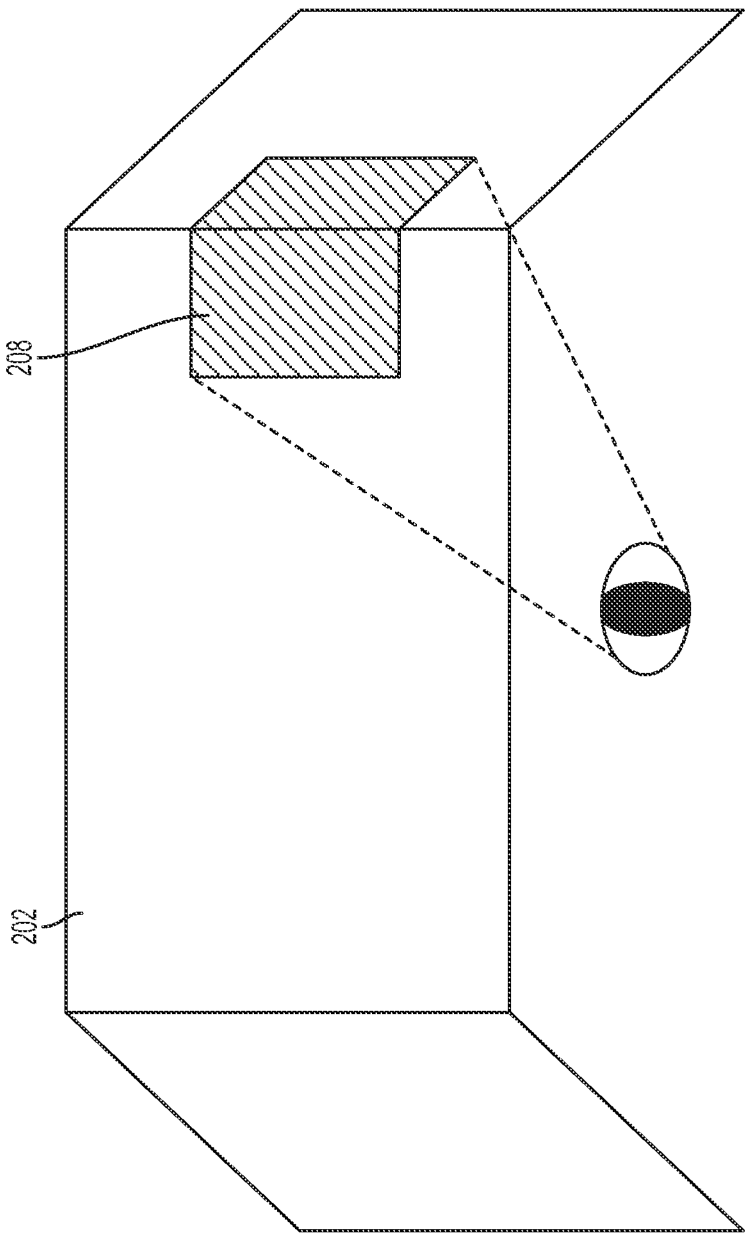

At 110, electronic gaming display device 12, 14 displays the updated view window to render visible additional prize selector game symbol(s) at various prize location(s) that were previously hidden. Electronic gaming display device 12, 14 displays a graphical navigation animation effect representative of navigating to the new portion of the interactive 3D game environment 202 based on the update action. FIG. 6 illustrates an updated view window 208 resulting from side movement navigation within the interactive 3D game environment 202.

Figure 7:
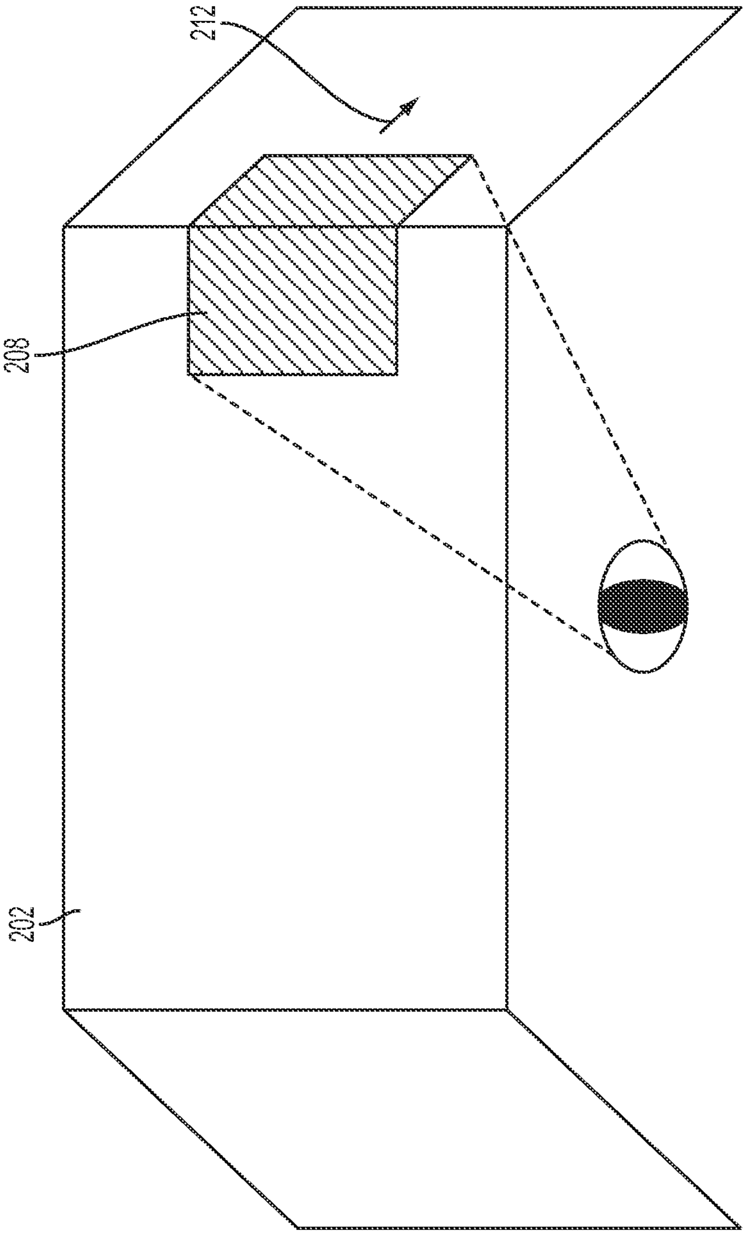
Figure 8:
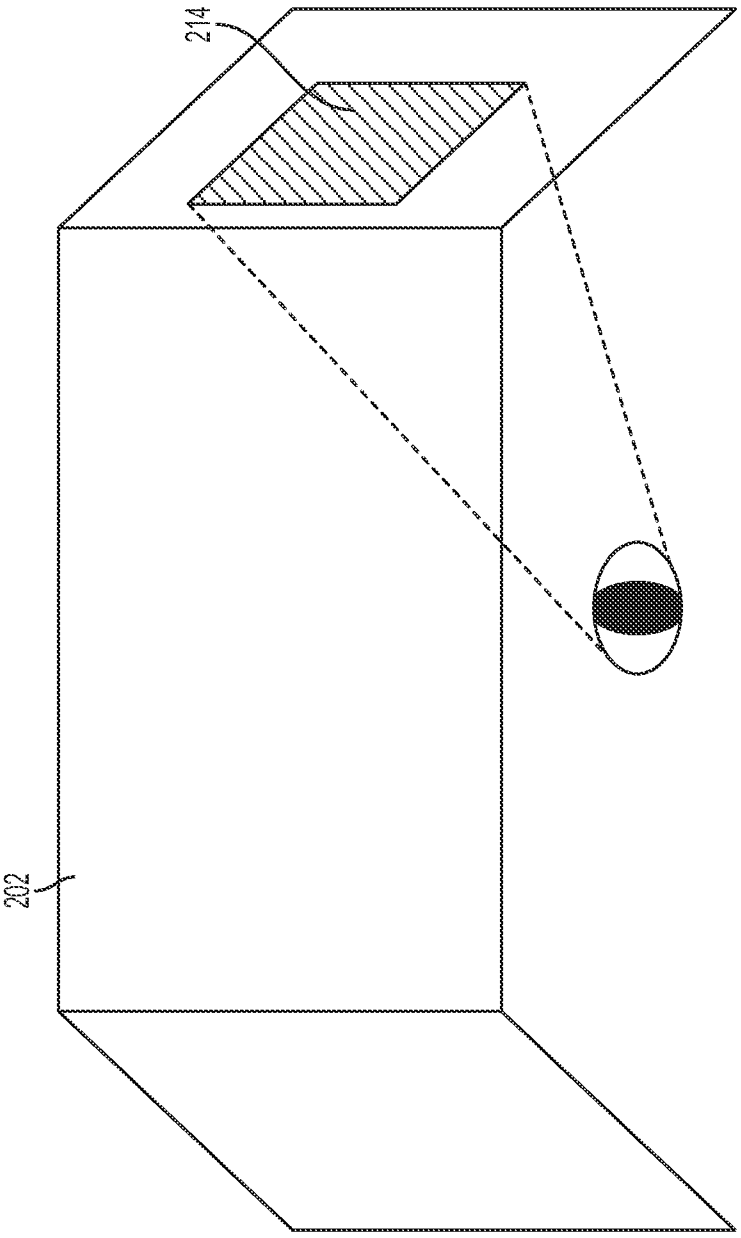

The process may repeat 106, 108, and 110 to continuously monitor and detect player request interaction input and update the view window in response. FIG. 7 illustrates the updated view window 208 resulting from the side movement navigation within the interactive 3D game environment 202 with another visual cue 212 providing guidance to the user of the option for additional side movement navigation. FIG. 8 illustrates a further updated view window 214 to display a further different portion of the interactive 3D game environment 202 based on an additional update action. The additional updated view window 214 results from additional side movement navigation within the interactive 3D game environment 202.

Figure 9:
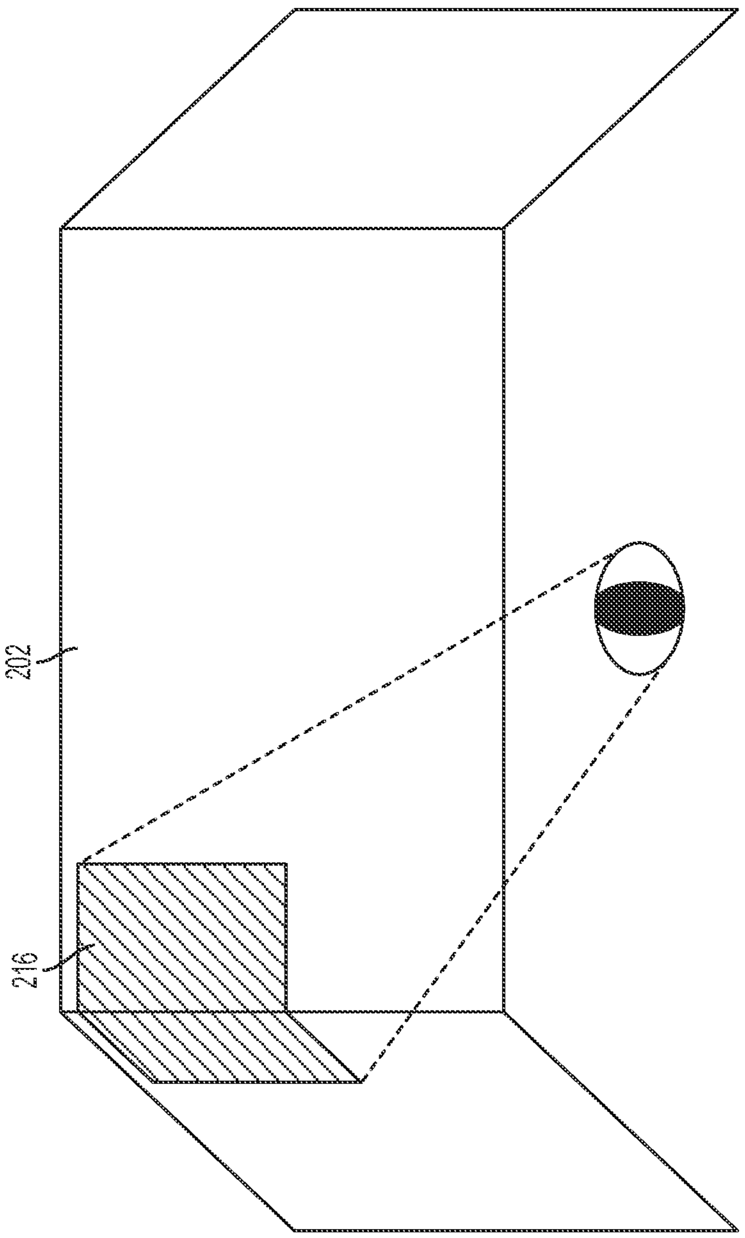
Figure 10:
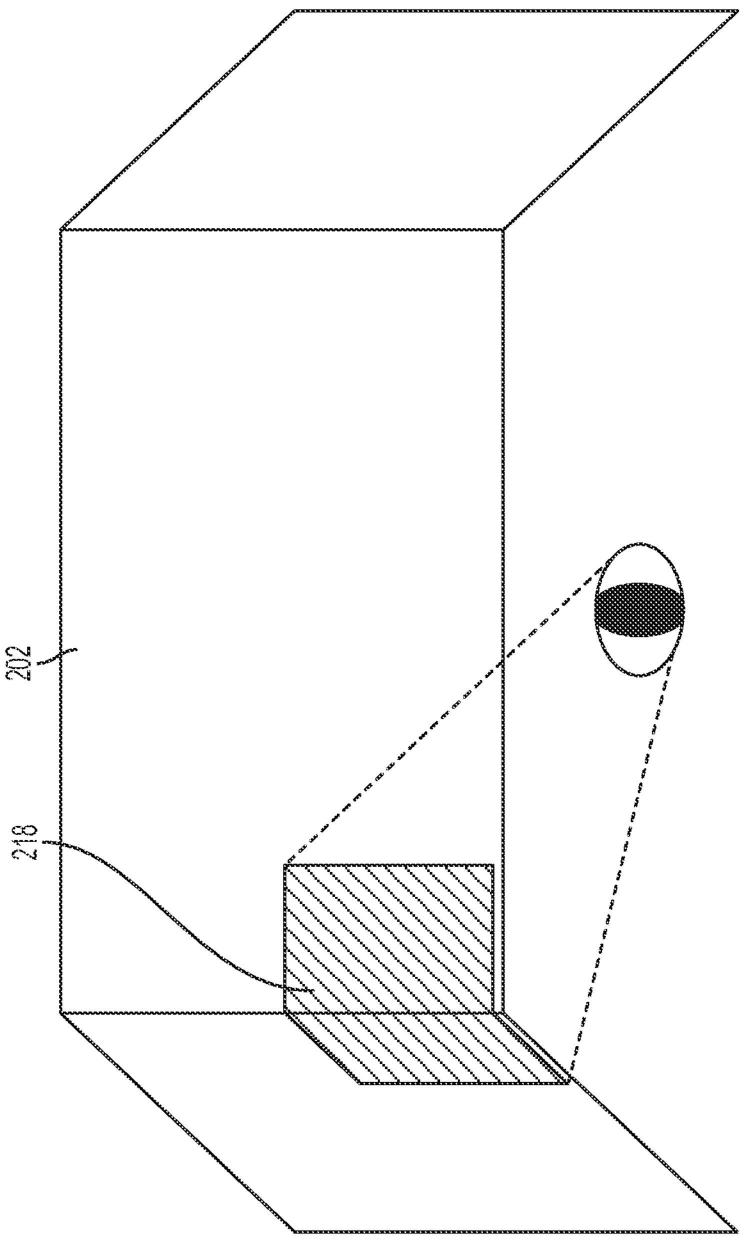

FIG. 9 illustrates another updated view window 216 to display another portion of the interactive 3D game environment 202 resulting from side movement navigation within the interactive 3D game environment 202 in the other direction. FIG. 10 illustrates another updated view window 218 to display another portion of the interactive 3D game environment 202 resulting from a down movement navigation within the interactive 3D game environment 202 in a downward direction.

Figure 11:
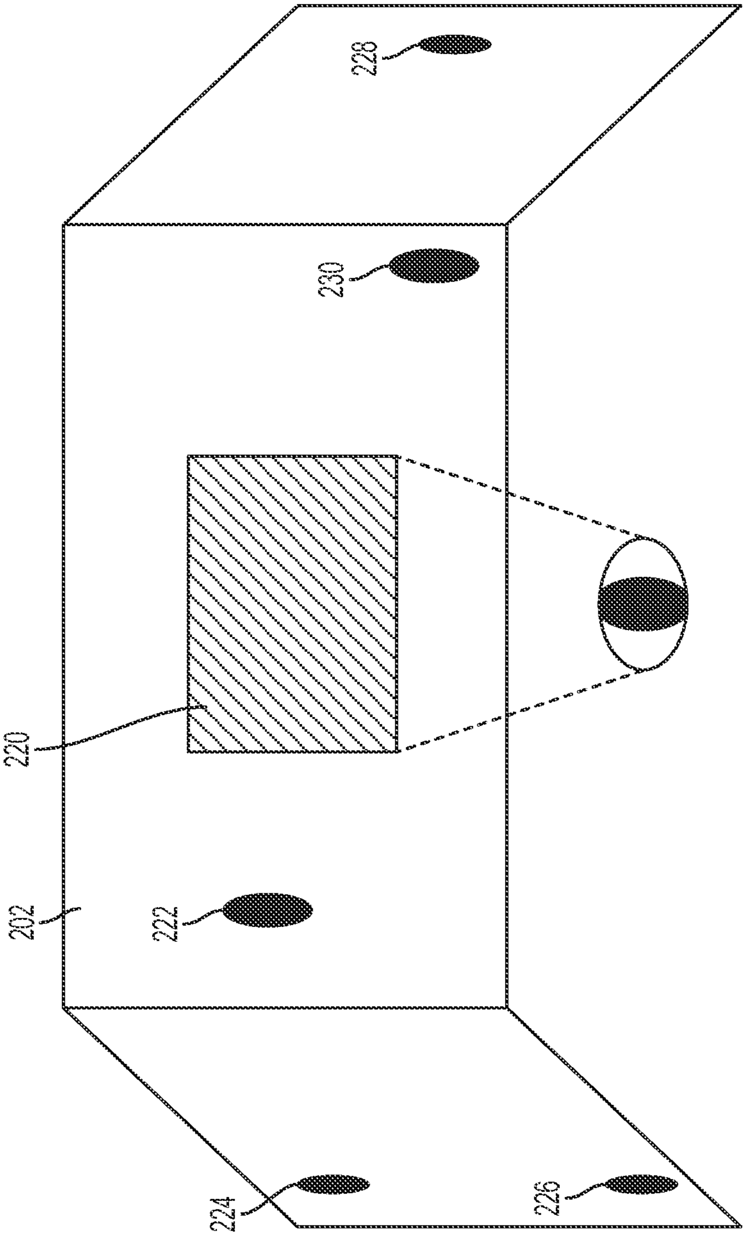
Figure 12:
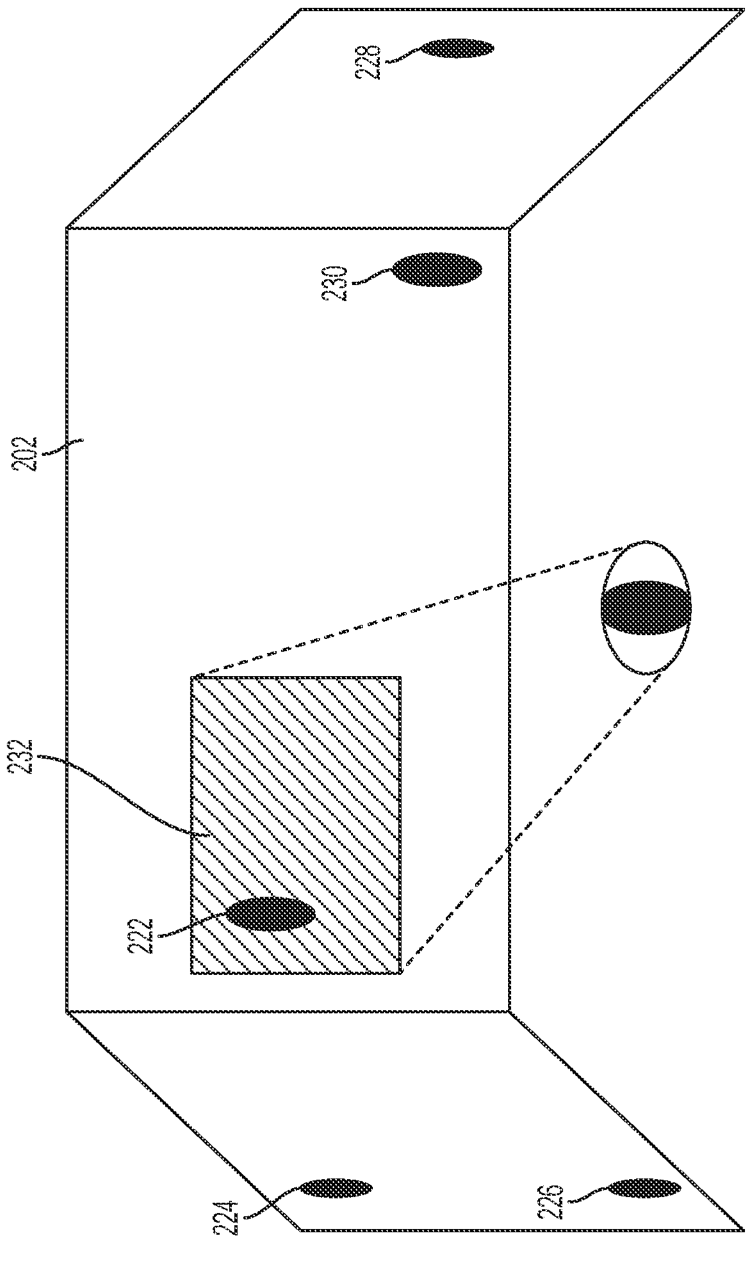

At 112, player input device 50 detects, at the electronic 3D enabled touch sensitive gaming display device 12, 14, player selection interaction input of the prize selector symbol at the prize location. This selection action triggers a winning outcome of the game. FIG. 11 illustrates a schematic diagram of the interactive 3D game environment 202 with prize selector symbols 222, 224, 226, 228, 230 at various prize locations. No prize selector symbols 222, 224, 226, 228, 230 may be visible in the current view window 220. FIG. 12 illustrates a schematic diagram of the interactive 3D game environment 202 with an updated view window 222 to render visible a prize selector symbol 222. Player may interact with electronic 3D enabled touch sensitive gaming display device 12, 14 to select the visible prize selector symbol 222 to trigger a winning outcome.

Figure 13:
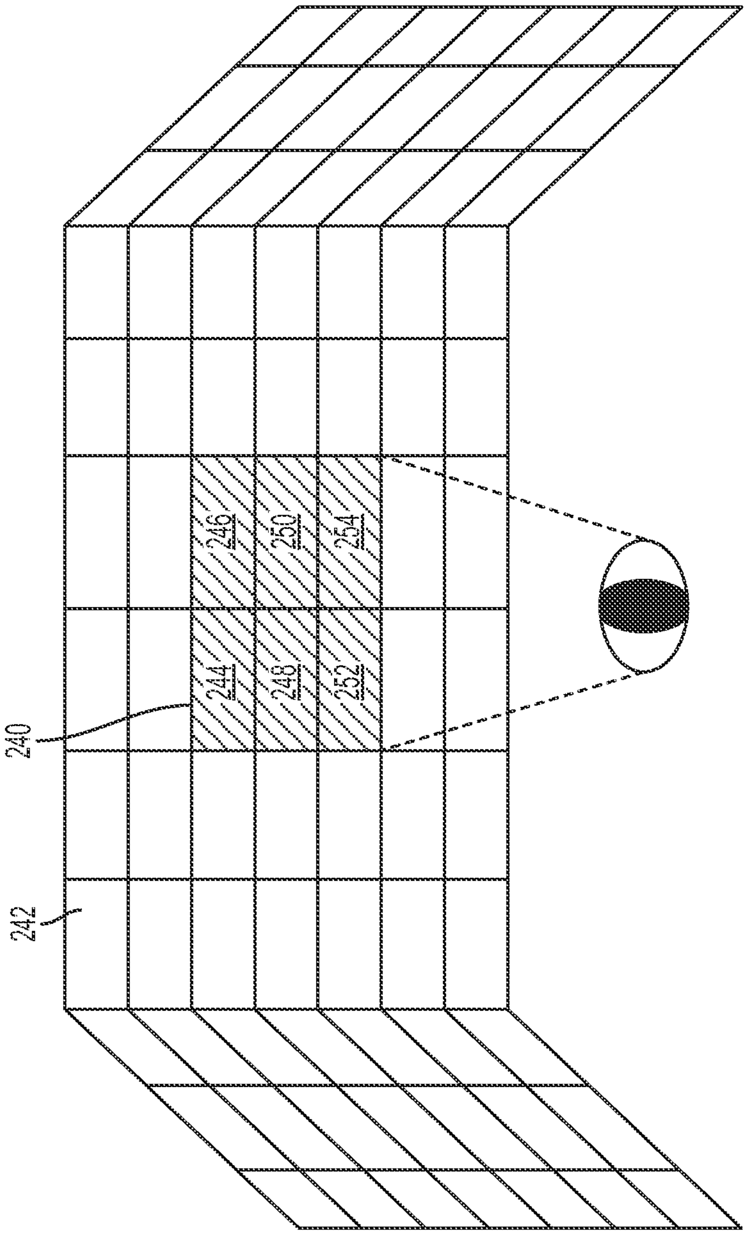
Figure 14:
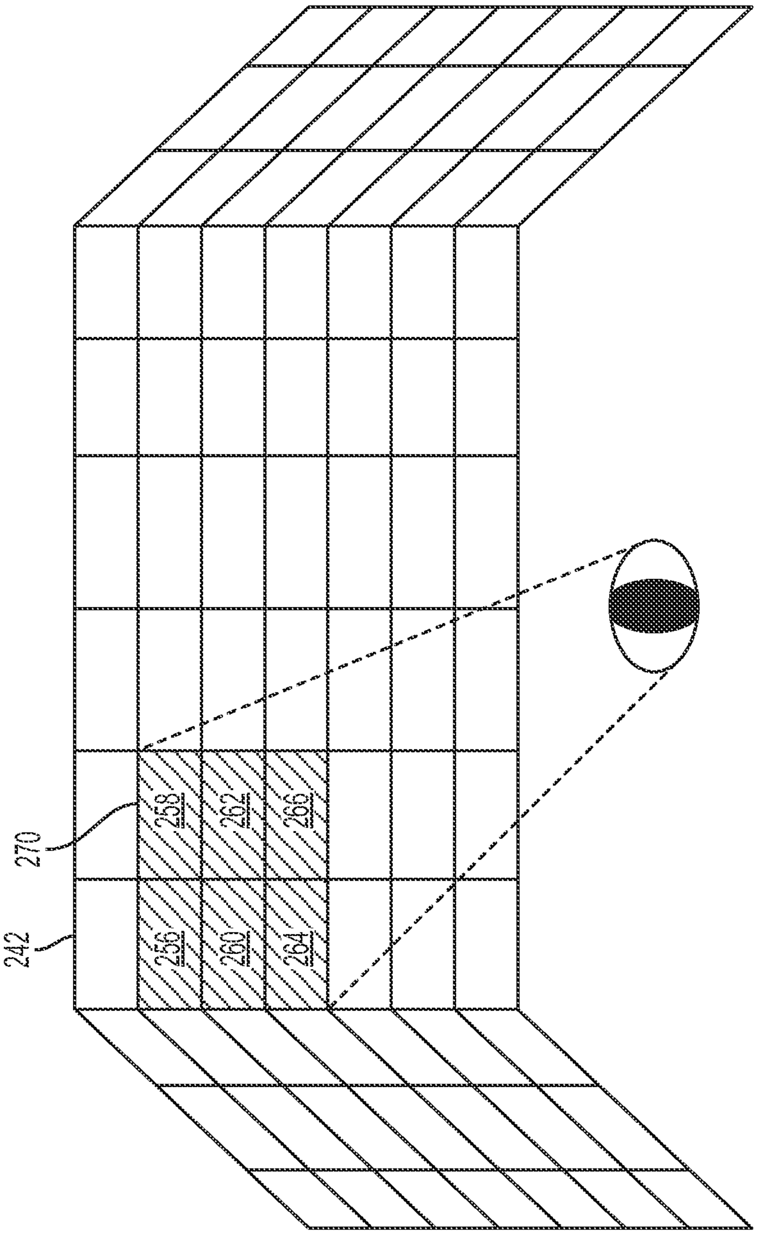
Figure 15:
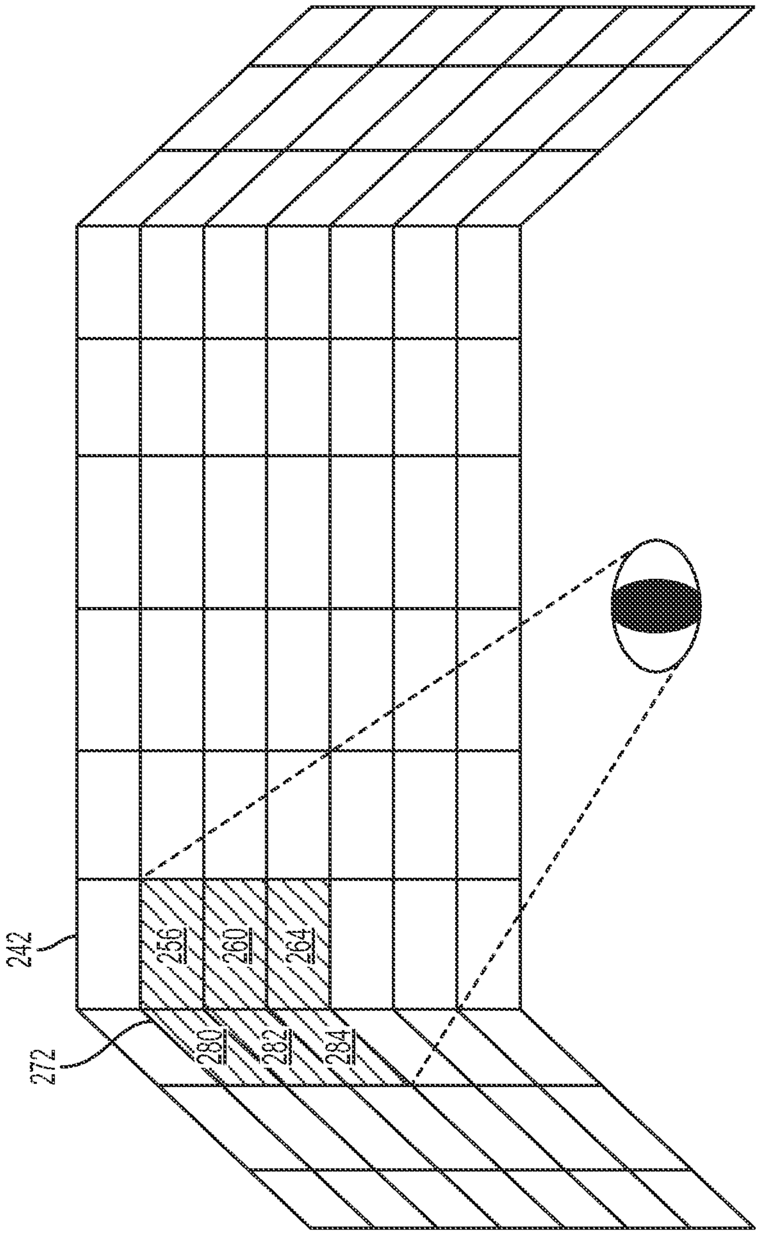

FIG. 13 illustrates a schematic diagram of the interactive 3D game environment 202 with a grid or game matrix of cells. The display controller 52 may use a mapping between a view window 240 and an interactive 3D game environment 242 at the cell level to track location of various prize selector symbols. The mapping may use coordinates, cell locations, or anchors to link the view window 240 and the interactive 3D game environment 242. The view window 240 defines a portion of the interactive 3D game environment 242 with cells 244, 246, 248, 250, 252, 254. FIG. 14 illustrates a schematic diagram of the interactive 3D game environment 202 with an updated view window 270 that defines a different portion of the interactive 3D game environment 242 with cells 256, 258, 260, 262, 264, 266. FIG. 15 illustrates a schematic diagram of the interactive 3D game environment 202 with a further updated view window 272 that defines another portion of the interactive 3D game environment 242 with cells 280, 282, 284, 256, 260, 264. The locations of the prize selector symbols may also be linked to cells of the interactive 3D game environment 202.

Figure 16:
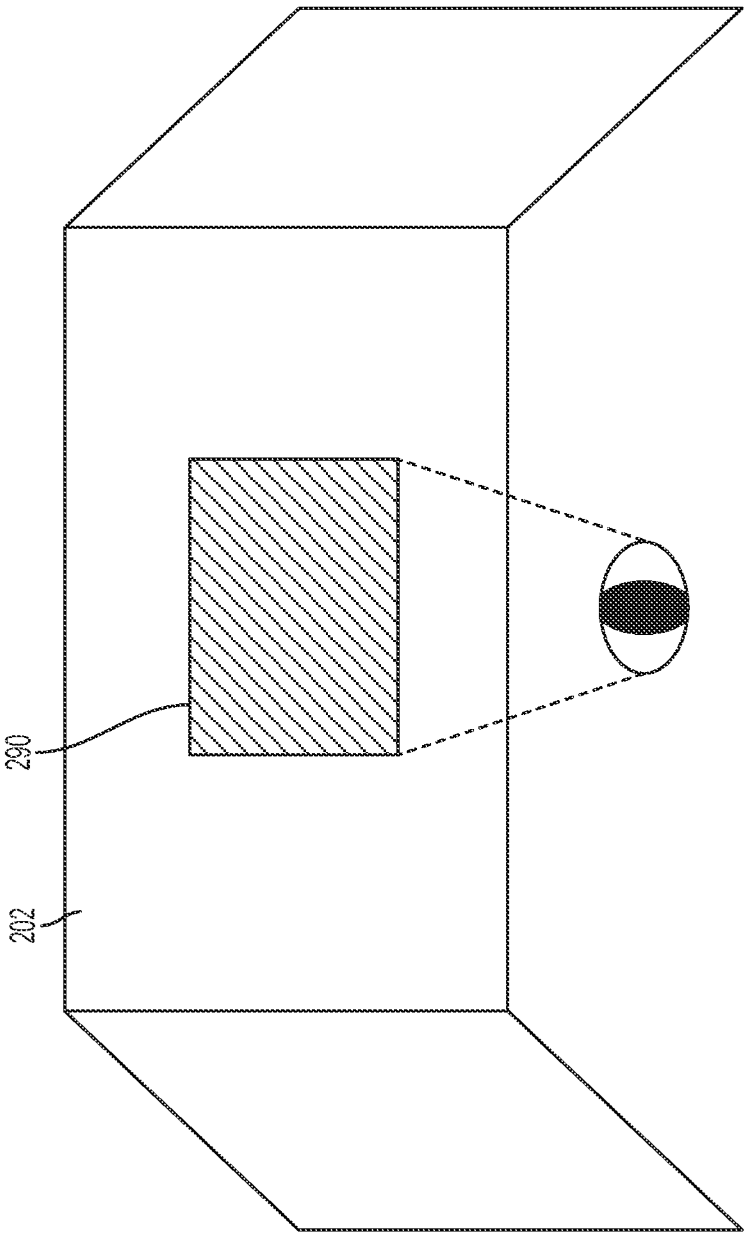
Figure 17:
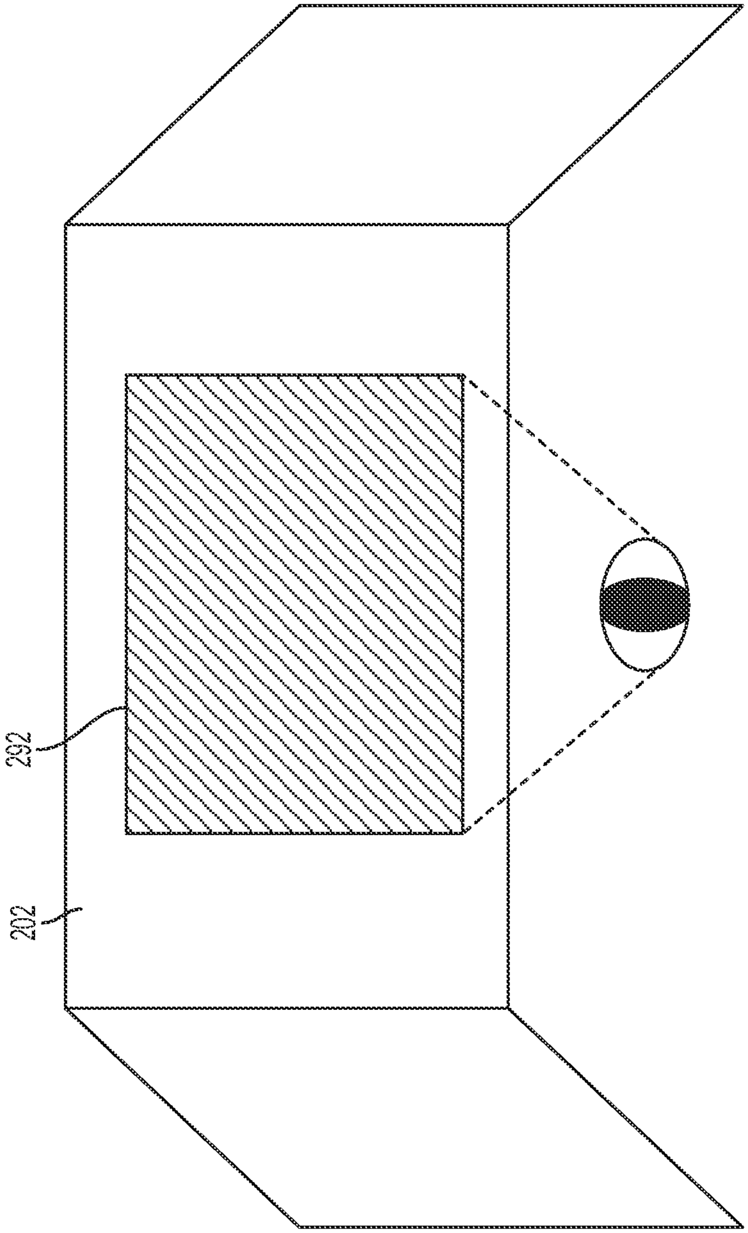

The update action of the player request interaction input may define various types of navigation within the interactive 3D game environment. For example, a rotation update action results in an updated view window that defines a rotated portion of the interactive 3D game environment. The update action may involve a request to move in at least one direction of up, down, left, right, and diagonal. The update action of the player request interaction input may define a request to increase the view window size to show a larger portion of the 3D game environment. FIG. 16 and FIG. 17 illustrate a smaller view window 290 and a larger updated view window 292 to show a larger portion of the 3D game environment 202. The update action of the player request interaction input may also define a request to decrease the view window.

As described, the player input device 50 may include a touch-screen display 12, 14 to detect different types of player touch interaction inputs. This detection process enables display controller 52 to calculate update action and determine the updated view window. Example touch interaction inputs include swipe up, swipe down, swipe left, swipe right, swipe diagonal, and swipe rotate.

The player input device 50 may include a tracking device to detect player interaction inputs. Example player interaction inputs include movement up, movement down, movement left, movement right, movement diagonal, and movement rotate. The tracking device may track movement of a physical input component or a physical player.

The player input device 50 may include a gesture recognition device for detecting player gestures as player request interaction input. The gesture recognition device processes the detected player gesture to generate the update action for transmission to display controller 52. Example gesture recognition devices include a sensor and camera.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may [note to draftsperson: consider describing example technical effects and solutions e.g. better memory usage, improved processing, improved bandwidth usage].

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. The scope is indicated by the appended claims.

What is claimed is:

1. An electronic gaming machine comprising:

at least one data storage device to store game data for a game;

a game controller for detecting game activation and controlling the game in accordance with a set of game rules using the game data;

a three-dimensional graphics processor to generate an interactive three-dimensional (3D) game environment, wherein the interactive environment provides a prize selection game zone comprising a plurality of prize selector game symbols visible at a plurality of prize locations;

an electronic 3D enabled touch sensitive gaming display device;

a display controller to control the electronic 3D enabled touch sensitive gaming display device using the 3D graphics processor to display a view window defining a first portion of the interactive 3D game environment;

a player input device to continuously detect, at the electronic 3D enabled touch sensitive gaming display device, player request interaction input to update the view window, wherein each player request interaction input comprises an update action to navigate to a second portion of the interactive 3D game environment comprising a prize selector game symbol at a prize location;

wherein, in response to detection by the player input device of a player request interaction input, the display controller controls the electronic gaming display device using the three-dimensional graphics processor to update the view window to navigate to the second portion of the interactive 3D game environment to render visible the prize selector game symbol at the prize location, wherein the update comprises a graphical navigation animation effect displayed on the electronic gaming display representative of navigating to the second portion of the interactive 3D game environment based on the update action;

wherein, the player input device detects, at the electronic 3D enabled touch sensitive gaming display device, player selection interaction input of the prize selector at the prize location to trigger a winning outcome of the game, and wherein the display controller controls the display device to display a plurality of view update indicia which indicate that the view window for three-dimensional game environment may be updated by at least one of a rotation movement, an upward movement, a downward movement, a left movement, and a right movement.

2. The electronic gaming machine of claim 1, wherein the update action of the player request interaction input defines a rotation of the portion of the three-dimensional game environment defined by the view window, and wherein the updated view window defines a rotated portion of the three-dimensional game environment.

3. The electronic gaming machine of claim 1, wherein the update action of the player request interaction input defines a request to move the view window to the second portion of the three-dimensional game environment, wherein the request to move is in at least one direction of up, down, left, right, and diagonal.

4. The electronic gaming machine of claim 1, wherein the update action of the player request interaction input defines a request to increase the view window to the different portion of the three-dimensional game environment, wherein the second portion of the three-dimensional game environment is larger than the first portion of the three-dimensional game environment.

5. The electronic gaming machine of claim 1, wherein the update action of the player request interaction input defines a request to decrease the view window to the second portion of the three-dimensional game environment, wherein the second portion of the three-dimensional game environment is smaller than the first portion of the three-dimensional game environment.

6. The electronic gaming machine of claim 1, wherein the player input device comprises a touch-screen display configured to detect a plurality of player touch interaction inputs, wherein plurality of touch interaction inputs comprise at least one of swipe up, swipe down, swipe left, swipe right, swipe diagonal, and swipe rotate.

7. The electronic gaming machine of claim 1, wherein the player input device comprises a tracking device configured to detect a plurality of player interaction inputs, wherein plurality of player interaction inputs comprise at least one of movement up, movement down, movement left, movement right, movement diagonal, and movement rotate.

8. The electronic gaming machine of claim 1, wherein the player input device comprises a gesture recognition device for detecting player gestures as player request interaction inputs and processing the detected player gestures to generate the update action, wherein the gesture recognition device comprises at least one of a sensor and camera.

9. The electronic gaming machine of claim 1, wherein the game controller is configured to: receive, via an input device, one or more wagers for one or more gaming outcomes, determine one or more gaming outcomes, wherein each gaming outcome comprises a selection of game symbols, determine that the one or gaming outcomes results in one or more winning game outcomes, and generate signals for distributing an award based on the one or more winning game outcomes.

10. An electronic gaming machine comprising:

at least one data storage device to store game data for a game;

a game controller for detecting game activation and controlling the game in accordance with a set of game rules using the game data;

a three-dimensional (3D) graphics processor to generate an interactive 3D game environment, wherein the interactive 3D environment provides a prize selection game zone comprising a plurality of prize selector game symbols visible at a plurality of prize locations, wherein the interactive 3D environment defines a game matrix of cells, wherein each prize location corresponds to a cell of the game matrix;

an electronic 3D enabled gaming display device;

a display controller to control the electronic 3D enabled touch sensitive gaming display device using the 3D graphics processor to display a view window defining a first portion of the interactive 3D game environment, wherein the first portion is defined by a first set of cells of the game matrix;

a player input device to continuously detect player request interaction input to update the view window, wherein each player request interaction input comprises an update action to navigate to a second portion of the interactive 3D game environment comprising a prize selector game symbol at a prize location, wherein the second portion is defined by a second set of cells of the game matrix;

wherein, in response to detection by the player input device of a player request interaction input, the display controller controls the electronic gaming display device using the 3D graphics processor to update the view window to navigate to the second portion of the interactive 3D game environment to render visible the prize selector game symbol at the prize location, wherein the update comprises a graphical navigation animation effect displayed on the electronic gaming display representative of navigating to the second portion of the interactive 3D game environment based on the update action;

wherein, the player input device detects, at the electronic 3D enabled gaming display device, player selection interaction input of the prize selector at the prize location to trigger a winning outcome of the game, and wherein the display controller controls the display device to display a plurality of view update indicia which indicate that the view window for 3D game environment may be updated by at least one of a rotation movement, an upward movement, a downward movement, a left movement, and a right movement.

11. The electronic gaming machine of claim 10, wherein the update action of the player request interaction input defines a rotation of the portion of the 3D game environment defined by the view window, and wherein the updated view window defines a rotated portion of the 3D game environment.

12. The electronic gaming machine of claim 10, wherein the update action of the player request interaction input defines a request to move the view window to the second portion of the 3D game environment, wherein the request to move is in at least one direction of up, down, left, right, and diagonal.

13. The electronic gaming machine of claim 10, wherein the update action of the player request interaction input defines a request to increase the view window to the different portion of the 3D game environment, wherein the second portion of the 3D game environment is larger than the first portion of the 3D game environment.

14. The electronic gaming machine of claim 10, wherein the update action of the player request interaction input defines a request to decrease the view window to the second portion of the 3D game environment, wherein the second portion of the 3D game environment is smaller than the first portion of the 3D game environment.

15. The electronic gaming machine of claim 10, wherein the player input device comprises a touch-screen display configured to detect a plurality of player touch interaction inputs, wherein plurality of touch interaction inputs comprise at least one of swipe up, swipe down, swipe left, swipe right, swipe diagonal, and swipe rotate.

16. The electronic gaming machine of claim 10, wherein the player input device comprises a tracking device configured to detect a plurality of player interaction inputs, wherein plurality of player interaction inputs comprise at least one of movement up, movement down, movement left, movement right, movement diagonal, and movement rotate.

17. The electronic gaming machine of claim 10, wherein the player input device comprises a gesture recognition device for detecting player gestures as player request interaction inputs and processing the detected player gestures to generate the update action, wherein the gesture recognition device comprises at least one of a sensor and camera.

18. The electronic gaming machine of claim 10, wherein the game controller is configured to: receive, via an input device, one or more wagers for one or more gaming outcomes, determine one or more gaming outcomes, wherein each gaming outcome comprises a selection of game symbols, determine that the one or gaming outcomes results in one or more winning game outcomes, and generate signals for distributing an award based on the one or more winning game outcomes.

* * * * *